United States Patent [19]

Tomalia et al.

[11] Patent Number: 4,857,599

[45] Date of Patent: Aug. 15, 1989

[54] MODIFIED DENSE STAR POLYMERS

[75] Inventors: Donald A. Tomalia; James R. Stahlbush, both of Midland, Mich.

[73] Assignee: The Dow Chemical Company, Midland, Mich.

[21] Appl. No.: 153,185

[22] Filed: Feb. 8, 1988

[51] Int. Cl.[4] .............................................. C08G 69/00
[52] U.S. Cl. ..................................... 525/259; 525/309; 525/310; 525/410; 525/416; 525/418; 525/451; 528/310; 528/350; 528/363; 528/373; 528/332; 528/374
[58] Field of Search ............... 525/259, 451, 309, 310, 525/410, 416, 418; 528/363, 310, 350, 373, 332, 374

[56] References Cited

U.S. PATENT DOCUMENTS

| | | | |
|---|---|---|---|
| 4,501,466 | 3/1985 | Tomalia et al. | 525/451 |
| 4,558,120 | 12/1985 | Tomalia et al. | 525/451 |
| 4,587,329 | 5/1986 | Tomalia et al. | 525/451 |
| 4,631,337 | 12/1986 | Tomalia et al. | 528/391 |
| 4,737,550 | 4/1988 | Tomalia | 525/418 |

Primary Examiner—Allan M. Lieberman

[57] ABSTRACT

Dense star polymers on immobilized cores are very useful as ion-exchange resins and chelation resins. For example, an aminated form of chloromethylated styrene/divinyl benzene copolymer can be employed as an immobilized core compound and reacted successively with methyl acrylate via a Michael addition reaction and then with ethylenediamine to form a first generation dense star polymer or dendrimer. These reactions can then be repeated to form second and third generation dendrimers.

9 Claims, No Drawings

MODIFIED DENSE STAR POLYMERS

CROSS-REFERENCE TO RELATED APPLICATIONS

This application is related to the following applications: Ser. No. 938,686, filed on Dec. 8, 1986, now U.S. Pat. No. 4,737,550; Ser. No. 812,479, filed on Dec. 23, 1985; Ser. No. 757,546, filed July 19, 1985, now U.S. Pat. No. 4,587,329; Ser. No. 641,807, filed on Aug. 17, 1984, now U.S. Pat. No. 4,568,737, which is a continuation-in-part of application Ser. No. 456,226, filed on Jan. 1, 1983, now U.S. Pat. No. 4,507,466; and Ser. No. 565,686, filed on Dec. 27, 1983) now U.S. Pat. No. 4,558,120.

BACKGROUND OF THE INVENTION

This invention relates to branched polymers containing dendritic branches having functional groups uniformly distributed on the periphery of such branches. This invention also relates to processes for preparing such polymers as well as applications therefore Star branched are known polymers which are characterized as having so-called star structured branching wherein the individual branches radiate out from a nucleus and there are at least 3 branches per nucleus. Such star branched polymers are illustrated by the polyquaternary compositions described in U.S. 4,036,808 and 4,102,827. Star branched polymers prepared from olefins and unsaturated acids are described in U.S. Pat. No. 4,141,847. The star branched polymers offer several advantages over polymers having other types of branching. For example, it is found that the star branched polymers may exhibit higher concentrations of functional groups thus making them more active for their intended purpose. In addition, such star branched polymers are often less sensitive to degradation by shearing which is a very useful property in formulations such as paints, in enhanced oil recovery and other viscosity applications. Additionally, the star branched polymers have relatively low intrinsic viscosities even at high molecular weight.

While the star branched polymers offer many of the aforementioned advantages over polymers having more conventional branching, it has been highly desirable to provide polymers which exhibit even greater concentrations of functional groups per unit volume of the polymer macromolecule as well as a more uniform distribution of such functional groups in the exterior regions of the macromolecule. In addition, it is often desirable to provide polymers having macromolecular configurations that are more spheroidal and compact than are the star branched polymers. These and other advantages have been achieved by the dense star polymers disclosed in U.S. Pat. No. 4,587,329. However, such dense star polymers often do not possess properties which are particularly desirable for ion-exchange resins.

Therefore, it would be very desirable to provide an improved dense star polymer having properties which render them particularly suitable as ion-exchange resins and chelation resins.

SUMMARY OF THE INVENTION

In its broadest aspect, this invention is an improved dense star polymer having at least one branch (hereinafter called a core branch) emanating from a core, said branch having at least two terminal groups provided that (1) the ratio of terminal groups to the core branches is more than one, preferably two or greater, (2) the density of terminal groups per unit volume in the polymer is at least 1.5 times that of an extended conventional star polymer having similar core and monomeric moieties and a comparable molecular weight and number of core branches, each of such branches of the extended conventional star polymer bearing only one terminal group, and (3) a molecular volume that is no more than about 80 percent of the molecular volume of said extended conventional star polymer as determined by dimensional studies using scaled Corey-Pauling molecular models. In addition the core of the dense star polymer is immobilized in the sense that the core and its precursor are insoluble in the solvent in which the dense star polymer is prepared. It is this immobilized core which distinguishes the improved dense star polymers of this invention from those described in U.S. Pat. No. 4,587,329.

For purposes of this invention, the term "dense" as it modifies "star polymer" means that it has a smaller molecular volume than an extended conventional star polymer having the same molecular weight. The extended conventional star polymer which is used as the base for comparison with the dense star polymer is one that has the same molecular weight, same core and monomeric components and same number of core branches as the dense star polymer. By "extended" it is meant that the individual branches of the conventional star polymer are extended or stretched to their maximum length, e.g., as such branches exist when the star polymer is completely solvated in an ideal solvent for the star polymer. In addition, while the number of terminal groups is greater for the dense star polymer molecule than in the conventional star polymer molecule, the chemical structure of the terminal groups is the same.

In a somewhat more limited and preferred aspect, this invention is a polymer having a novel ordered star branched structure (herein called starburst structure). Hereinafter, this polymer having a starburst structure is called a dendrimer. Thus, a "dendrimer" is a polymer having a polyvalent core that is covalently bonded to at least two ordered dendritic (tree-like) branches which extend through at least two generations. As an illustration, an ordered second generation dendritic branch is given in U.S. Pat. No. 4,587,329, which is hereby incorporated by reference in its entirety. A primary characteristic of the ordered dendritic branch which distinguishes it from conventional branches of conventional polymers is the uniform or essentially symmetrical character of the branches as is shown in U.S. Pat. No. 4,587,329. In addition, with each new generation, the number of terminal groups on the dendritic branch is an exact multiple of the number of terminal groups in the previous generation.

Another aspect of this invention is an excess reactant process for producing the dense star polymer comprising the steps of
(A) contacting
    (1) an immobilized core compound having at least one nucleophilic or one electrophilic moiety (hereinafter referred to in the alternative as N/E moieties) with
    (2) an excess of a first organic coreactant having (a) one moiety (hereinafter called a core reactive moiety) which is reactive with the N/E moieties of the immobilized core compound and (b) an N/E moiety which does not react with the N/E moiety of the core compound under conditions sufficient to form a core adduct wherein each N/E moiety of the core compound has reacted with the core reactive moiety of a different molecule of the first coreactant:

(B) contacting
  (1) the core adduct having at least twice the number of N/E moieties as the core compound with
  (2) an excess of a second organic coreactant having (a) one moiety (hereinafter called an adduct reactive moiety) which will react with the N/E moieties of the core adduct and (b) an N/E moiety which does not react with the N/E moiety of the core adduct under conditions sufficient to form a first generation adduct having a number of N/E moieties that are at least twice the number of N/E moieties in the core adduct: and (C) contacting the first generation adduct with an excess of a third organic coreactant having one moiety that is reactive with the N/E moieties of the first generation adduct and an N/E moiety that does not react with the N/E moieties of the first generation adduct under conditions sufficient to form a second generation dendrimer. In the foregoing process, the first coreactant differs from the second coreactant, and the second coreactant differs from the third coreactant, but the first and third coreactants may be the same or different compounds. The third and higher generation dendrimers are formed by repeating steps (B) and (C) of the aforementioned process.

A further aspect of this invention is a partially protected reactant process for producing the dense star polyamine comprising the steps of (A) contacting
  (1) an immobilized core compound having at least one N/E moiety
  (2) a first organic coreactant having a moiety which is reactive with the N/E moieties of the core compound and a blocking moiety (which does not react with the N/E moieties of the core compound under conditions sufficient to form a blocked core adduct wherein each N/E moiety of the core compound has reacted with the reactive moiety of a different molecule of the first organic coreactant to form an adduct having blocked N/E moieties:

(B) removing the blocking moieties from the blocked core adduct to form a first generation adduct having N/E moieties:

(C) contacting
  (1) the first generation adduct which has at least twice the number of terminal N/E moieties as the core compound with
  (2) a second organic coreactant having a moiety which will react with the terminal N/E moieties of the first generation adduct and a blocking moiety (which does not react with the N/E moieties of the first generation adduct) under conditions sufficient to form a blocked second generation adduct having a number of blocked second generation adducts having a number of blocked N/E moieties that are at least twice the number of blocked N/E moieties in the blocked core adduct; and (D) removing the blocking moieties from the blocked second generation adduct to form a second generation adduct or dendrimer.

In the foregoing partially protected reactant process, the first and second organic coreactant used in the formation of the first and second generation dendrimers may be the same of different. The third and higher generation dendrimers are formed by repeating steps (C) and (D) of the aforementioned process, provided that such generations are not prevented by excessive dense surface packing of the terminal groups in such additional generations. By "dense surface packing", it is meant that the congestion of reactive moieties on the surface of the dense star polymer is so high that further reaction on a stoichiometric basis is prevented. This feature is also sometimes called "sterically induced stoichiometry".

Other aspects of this invention are methods for using the dense star polymer in such application as demulsifiers for oil/water emulsions, wet strength agents in the manufacture of paper, size selective membranes, high efficiency proton scavengers, and calibration standards for electron microscopy, agents for modifying viscosity in aqueous formulations such as paints, and the like. For example, in a demulsification method, an emulsion of oil and water is contacted with a demulsifying amount of the dense star polymer under conditions sufficient to cause phase separation.

The dense star polymers of the present invention exhibit the following properties which are unique or are superior to similar properties of conventional extended star branched polymers and other branched polymers having similar molecular weight and terminal groups:

(a) radii of gyration about 1/10 that of linear random coil polymers of equivalent molecular weight;
(b) surface terminal group densities of one group per 90–120 square Angstrom units ($Å^2$) for the first through fourth generations and one terminal group per 30–90 $Å^2$ for the fifth through tenth generations: and
(c) ease of processing and purification.

In regard to the latter property, the polymers can be purified by simple washing in contrast to the use of ultrafiltration employed to purify dense star polymers having soluble or mobile cores.

DETAILED DESCRIPTION OF ILLUSTRATIVE EMBODIMENTS

In the dense star polymers of the present invention, the immobilized core is covalently bonded to at least three core branches, with each core branch having a calculated length of at least 3 Angstrom units (Å), preferably at least 4 Å, most preferably at least 6 Å. These polymers preferably have an average of at least 2, more preferably at least 3 and most preferably at least 4 terminal groups per polymer molecule. Preferably, the core branches have a dendritic character, most preferably an ordered dendritic character as defined hereinafter.

The dense star polymers of this invention preferably have two-dimensional molecular diameters in the range from about 12 to about 2000 Angstrom units (Å), more preferably from about 25 Å to about 500 Å and most preferably from about 50 Å to about 250 Å. For the purposes of this invention, a two-dimensional molecular diameter is determined by the electron microscopic method described in U.S. Pat. No. 4,587,329.

The dense star polymers of this invention preferably have three-dimensional molecular diameters in the range from about 6 to about 1000, more preferably from about 10 to about 250, most preferably from about 25 to about 125 Angstrom units. For the purposes of this invention, a three-dimensional molecular diameter is determined by calculating hydrodynamic diameters using the Hester-Mitchell relationship, R. D. Hester et al., *J. Poly Sci.*, Vol. 18, p. 1717 (1980) as described in U.S. Pat. No. 4,587,329.

In preferred dense star polymers, the terminal groups are functional groups that are sufficiently reactive to undergo addition or substitution reactions. Examples of such functional groups include amino, hydroxy, mercapto, carboxy, alkenyl, allyl, vinyl, amido, halo, urea, oxiranyl, aziridinyl, oxazolinyl imidazolinyl, sulfonato, phosphonato, isocyanato and isothiocyanato. The dense star polymers differ from conventional star or star-branched polymers in that the dense star polymers have a greater concentration of terminal groups per unit of molecular volume than do conventional extended star polymers having an equivalent number of core branches and an equivalent core branch length. Thus, the density of terminal groups per unit volume in the dense star polymer is at least about 1.5 times the density of terminal groups in the conventional extended star polymer, preferably at least 5 times, more preferably at least 10 times, most preferably from about 15 to about 50 times. The ratio of terminal groups per core branch in the dense polymer is preferably at least 2, more preferably at least 3, most preferably from about 4 to about 1024. Preferably, for a given polymer molecular weight, the molecular volume of the dense star polymer is less than 70 volume percent, more preferably from about 16 to about 60, most preferably from about 7 to about 50 volume percent of the molecular volume of the conventional extended star polymer.

In the preferred polyether dense star polymers, the density of terminal functional moieties, usually hydroxy, in the polymer is readily expressed as the molar ratio of terminal functional moieties to the total ether moieties In such polymers this molar ratio of terminal groups to ether groups is preferably from about 0.3:1 to about 4:1, more preferably from about 0.7:1 to about 3:1, most preferably from about 1:1 to about 2:1.

The preferred dendrimers of the present invention are characterized as having a polyvalent immobilized core that is covalently bonded to at least three ordered dendritic branches which extend through at least two generations. Such ordered branching can be illustrated by the following sequence wherein G indicates the number of generations:

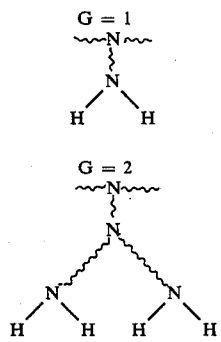

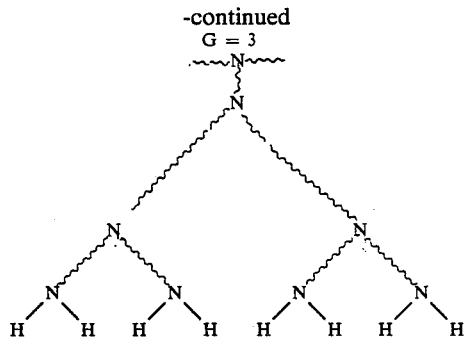

Mathematically, the relationship between the number of terminal groups on a dendritic branch and the number of generations of the branch can be represented as follows:

$$\frac{\text{\# of terminal groups}}{\text{per dendritic branch}} = \frac{N_r{}^G}{2}$$

wherein G is the number of generations and $N_r$ is the repeating unit multiplicity which is at least 2 as in the case of amines. The total number of terminal groups in the dendrimer is determined by the following:

$$\frac{\text{\# of terminal groups}}{\text{per dendrimer}} = \frac{N_c N_r{}^G}{2}$$

wherein G and $N_r$ are as defined before and $N_c$ represents the valency (often called core functionality) of the core compound Accordingly, the dendrimers of the present invention can be represented in its component parts as follows:

$$(\text{Core})\left[(\text{Repeat Unit})\frac{N_r{}^G - 1}{N_r - 1}(\text{Terminal Moiety})\frac{N_r{}^G}{2}\right]N_c$$

wherein the Core, Terminal Moiety, G and $N_c$ are as defined before and the Repeat Unit has a valency or functionality of $N_r+1$ wherein $N_r$ is as defined before.

A copolymer dendrimer which is preferred for the purposes of this invention is a unique compound constructed of polyfunctional monomer units in a highly branched (dendritic) array. The dendrimer molecule is prepared from a polyfunctional initiator unit (core compound), polyfunctional repeating units and terminal units which may be the same or different from the repeating units. The core compound is represented by the formula $I(Z^c)_{N_c}$ wherein I represents the core, Z represents the functional groups bonded to I and Nc represents the core functionality which is preferably 2 or more, most preferably 3 or more. Thus, the dendrimer molecule comprises a polyfunctional core, I, bonded to a number (Nc) of functional groups, $Z_c$, each of which is connected to the monofunctional tail of a repeating unit $X^1Y^1(Z^1)_N1$, of the first generation and each of the Z groups of the repeating unit of one generation is bonded to a monofunctional tail of a repeating unit of the next generation until the terminal generation is reached. In the dendrimer molecule, the repeating units are the same within a single generation, but may differ from generation to generation. In the repeating unit, $X^1Y^1(Z^1)_N1$, $X^1$ represents the monofunctional tail of the first generation repeating unit, $Y^1$ represents the moiety constituting the first generation, $Z^1$ represents the functional group of the polyfunctional head of the repeating unit of the first generation and may be the same as or different from the functional groups of the core compound, $I(Z)_{Nc}$, or other generations: and $N^1$ is a number of 2 or more, most preferably 2, 3 or 4, which represents the multiplicity of the polyfunctional head of the repeating unit in the first generation. Generically, the repeating unit is represented by the formula $X^iY^i(Z^i)_{Ni}$ wherein "i" represents the particular generation from the first to the $T-1$ generation. Thus, in the preferred dendrimer molecule, each $Z^1$ of the first generation repeating unit is connected to an $X^2$ of a repeating unit of the second generation and so on through the generations such that each $Z^i$ group for a repeating unit $X^iY^i(Z^i)_{Ni}$ in generation number "i" is connected to the tail ($X^{i+1}$) of the repeating unit of the generation number "i+1". The final or terminal of a preferred dendrimer molecule comprises terminal units, $X^tY^t(Z^t)_{Nt}$ wherein t represents terminal generation and $X^t$, $Y^t$, $Z^t$ and $N^t$ may be the same as or different from $X^i$, $Y^i$, $Z^i$ and $N^i$ except that there is no succeeding generation connected to the $Z^t$ groups and $N^t$ may be less than two, e.g., zero or one. Therefore the preferred dendrimer has a molecular formula represented by $$( I \ (Z^c) \ N_c) \left[ (X^iY^i \ (Z^i) \ N^i) \ N_c \prod_{n=1}^{i-1} N^n \right] (X^tY^t \ (Z^t) \ N^t) \ N_c \ \pi \ N^n.$$

for $i = 0$ to $t - 1$ wherein the symbols are as previously defined. The n function is the product of all the values between its defined limits. Thus $$\prod_{n=1}^{i-1} N^n = (N^1)(N^2)(N^3)(N^{i-2})(N^{i-1})$$

which is the number of repeat units, $X^iY^i(Z^i)_{Ni}$, comprising the ith generation of one dendritic branch. In copolymer dendrimers, the repeat unit for one generation differs from the repeat unit in at least one other generation. The preferred dendrimers are very symmetrical as illustrated in structural formulas described hereinafter. Preferred dendrimers may be converted to functionalized dendrimers by contact with another reagent. For example, conversion of hydroxyl in the terminal generation to ester by reaction with an acid chloride gives an ester terminally functionalized dendrimer. This functionalization need not be carried out to the theoretical maximum as defined by the number of available functional groups and, thus, a functionalized dendrimer may not have high symmetry or a precisely defined molecular formula as is the case with the present dendrimer.

An illustration of a functionality active dendrimer of a ternary or trivalent core which has three ordered, second generation dendritic branches is depicted by the following configuration:

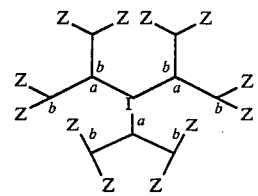

wherein I is a trivalent core atom or molecule having a covalent bond with each of the three dendritic branches, Z is a terminal moiety and "a" and "b" are as defined hereinbefore.

While the foregoing configuration and formula illustrate a trivalent immobilized core, the core atom or molecule may be any polyvalent or polyfunctional insoluble moiety, preferably a polyvalent or polyfunctional insoluble moiety having from 3 to about 2300 valence bonds or functional sites available for bonding with the dendritic branches, most preferably from about 3 to about 200 valence bonds or functional sites.

The terminal groups of the dendrimer may be any functionally active moiety that can be used to propagate the dendritic branch to the next generation. Examples of such other moieties include alkoxycarbonyl, amino, alkenyl, aziridinyl, oxazolinyl, haloalkyl, carboxyl including carboxylic esters, mercapto, oxiranyl, isothiocyanato and isocyanato, with hydroxy or amine moieties being preferred. While the dendrimers preferably have dendritic branches having 2 to 6 generations, dendrimers having dendritic branches up to 12 generations are suitably made and employed in the practice of this invention.

The dense star polymers of this invention are readily prepared by reacting an insoluble compound capable of generating a polyvalent immobilized core with a compound or compounds which causes propagation of dendritic branches from the core. For the purposes of this invention, an insoluble compound suitable for producing the immobilized core is insoluble in the reaction medium used to produce the dense polymer. This insoluble compound is also insoluble in water and liquid organic solvents such as aliphatic and aromatic hydrocarbons. In one method of preparing these dendrimers (herein called the successive excess reactant method), it is essential to maintain an excess of coreactant to reactive moieties in the terminal groups in the core, core adduct or subsequent adducts and dendrimers in order to prevent cross-linking and to maintain the ordered character of the dendritic branches. In general, this excess of coreactant to reactive moieties in the terminal groups is from about 2:1 to about 1000:1, preferably from about 3:1 to about 120:1 on a molar basis.

Alternatively, the insoluble compound capable of generating a polyvalent immobilized core, $W(X)_n$, wherein W is the polyvalent core atom and is covalently bonded to nX reactive terminal groups ($n \geq 2$), is reacted with a partially protected multifunctional reagent, $T{-}(U)V_m$, wherein U represents a multivalent moiety covalently bonded to mV protected moieties ($m \geq 2$), and to one T, a moiety capable of reacting with X to form $W[(X'{-}T'{-}UV_m]_n$, wherein X' and T' represent the residue of reaction between X and T. This first generation compound is then subjected to activation conditions whereby the V moieties are made reactive (deprotected) and reacted with the partially protected multifunctional reagent, $T{-}U{-}V_m$, to form the second generation protected dendrimer, W[(X'—T-'+UV$_m$T'=UV$_m$]$_n$. This protected dendrimer can be activated and reacted again in a similar manner to provide the third generation protected dendrimer.

The successive excess reactant method of preparing the dendrimers is illustrated by the preparation of a ternary dendritic polyamidoamine. In this method, an aminated form of a chloromethylated polystyrene which has been cross-linked to insolubility with divinylbenzene, i.e., a nucleophilic core compound or moiety, is first reacted with methyl acrylate under conditions sufficient to cause the Michael addition of the amine moieties of the aminated resin to at least two molecules of the methyl acrylate to form the following diester core adduct:

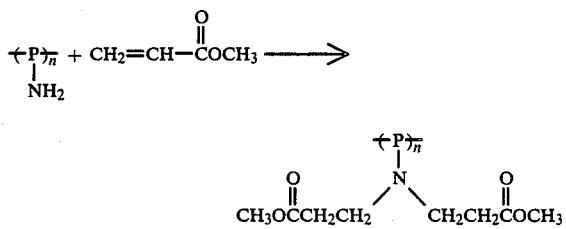

wherein P represents an insoluble polymer having "n" mers with pendant amine moieties.

Following removal of unreacted methyl acrylate, this compound is then reacted with excess ethylenediamine under conditions such that one amine group of the ethylenediamine molecule reacts with the methyl carboxylate groups of the core adduct to form a first generation adduct having at least two amidoamine moieties represented by the formula:

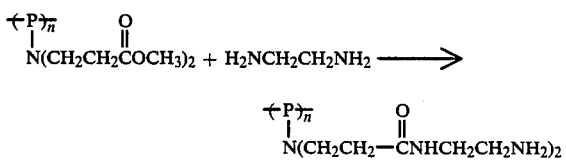

The molar excess of ethylenediamine to methyl acrylate moieties is preferably from 4:1 to 50:1. Following removal of unreacted ethylenediamine, this first generation adduct is then reacted with excess methyl acrylate under Michael's addition conditions to form a second generation adduct having terminal methyl ester moieties:

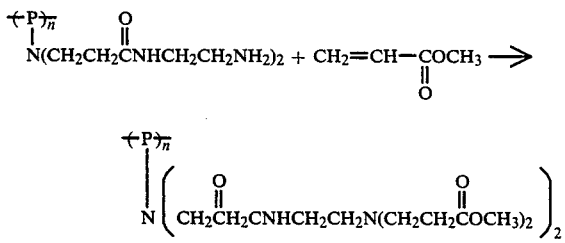

which is then reacted with excess ethylenediamine under amide-forming conditions to produce the desired polyamidoamine dendrimer having ordered, second generation dendritic branches with terminal amine moieties The molar excess of coreactant to reactive moieties in each case is preferably from 1.1:1 to about 400:1, most preferably from about 3:1 to about 100:1. Similar dendrimers containing amidoamine moieties can be made by using a variety of insoluble polymers having pendant amine moieties, e.g., vinylbenzyl chloride/divinylbenzene copolymers which have been aminated, cross-linked copolymers of aminoalkyl acrylates and methacrylates and the like.

Other dendrimers made by the successive excess reactant method are polysulfides made by (1) reacting an insoluble polythiol, I(CH$_2$SH)$_4$, under basic conditions with epichlorosulfide (prepared by method of I. Tabushi et al., Z. Bull. Chem. Soc. Japan, 47, 1435 (1974) to form the first generation polyepisulfide,

and (2) then reacting this polyepisulfide with hydrogen sulfide to form the first generation polysulfide which can be further reacted with epichlorosulfide and hydrogen sulfide to form subsequent generations. The conditions and procedures which may be suitably employed for polysulfide formation are generally described in Weissberger, *Heterocyclic Compounds with Three-and Four-Membered Rings*, Interscience Publishers, N.Y 605 (1964) and Meade et al., *J. Chem. Soc.*, 1894 (1948). Polyaminosulfide dendrimers can be prepared by reacting an aminated form of an insoluble resin having a plurality of pendant primary amine groups with an excess of ethylene sulfide to form a polysulfide and then with excess aziridine to form a first generation polyamino sulfide which can be reacted with excess ethylene sulfide and then with excess aziridine to form further generations using general reaction conditions described in U.S. 2,105,845 and Nathan et al., *J. Am. Chem. Soc.*, 63, 2361 (1941). The polyether or polysulfide dendrimers can also be prepared by the excess reactant method by reacting a halogenated form of an insoluble resin, e.g., chloromethylated styrene/divinylbenzene copolymer, with phenol of thiophenol to form a first generation polyarylether or polyarylsulfide and then with excess halogen to form the first generation polyhaloarylpolysulfide and then with further phenol or thiophenol to form further generations according to the procedures and conditions as described by D. D. MacNicol et al., *Tetrahedron Letters*, 23, 4131-4 (1982).

The insoluble or immobilized dense star polyethers are preferably prepared by the partially protected reactant method wherein a first organic coreactant,

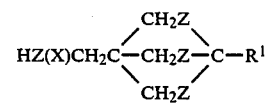

wherein X is a divalent organic radical such as alkylene, arylene, polyalkyleneoxy or polyalkylenethio, Z is oxygen or sulfur, and R$_1$ is hydrogen or alkyl, is first contacted with alkali metal, , to form a nucleophilic salt,

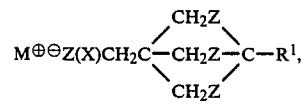

which is then reacted with an insoluble electrophilic core moiety, I(E)$_n$ wherein I represents a n-valent insoluble core such as one derived from an insoluble polyhalide, wherein E represents an electrophilic moiety such as tosylate, triflate, halo, sulfate, phosphate, oxiranyl (epoxy), aziridinyl, thioepoxy, oxazolinium cation or oxazinium cation and n is a number from 1 to 1000, preferably 3 to 100, to a protected first generation adduct,

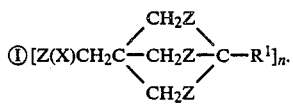

This adduct is then demasked, usually by addition of acid, to form the unprotected first generation adduct,

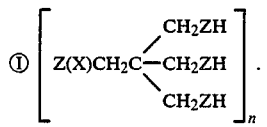

This first generation adduct is contacted with alkali metal to form

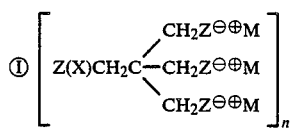

which is then reacted with

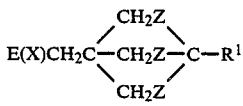

to form the second generation adduct,

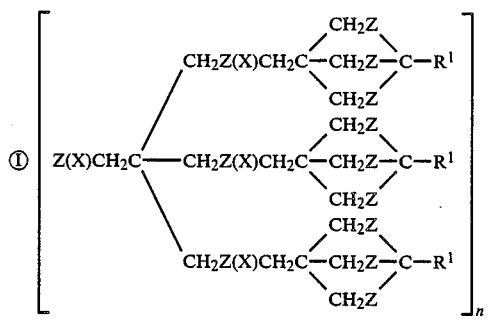

which is then demasked to form the second generation adduct. These generation building steps: metallization, electrophilic reaction and demasking can be repeated to form a third and higher generations until steric hindrance (dense packing) prevents further reaction. It is understood that X groups in one generation are the same, but may differ from X groups in other generations. The same is true for Z groups. Moreover, the foregoing reaction sequence depicts all generation building steps with multiplicity of three,

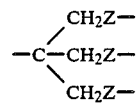

Such multiplicity may be changed from one generation to another. Also, it is understood that the partially protected method may be practiced by reacting a nucleophilic core, I(Z⊖⊕M)n with an electrophilic first organic coreactant,

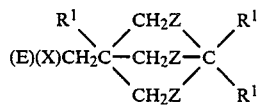

to make the masked first generation adduct.

In an illustrative embodiment of the partially protected reactant method using a nucleophilic core moiety, an immobilized resin having pendant hydroxyl, amino, mercapto and combinations of two or more of hydroxyl, amino and mercapto is employed as the polyvalent core generating compound and is converted to alkali metal salt form, e.g., sodium or lithium, by reaction with alkali metal hydroxide or zero valent alkali metal and then reacted with a molar excess of a partially protected compound such as tosylate ester of 1-ethyl-4-hydroxymethyl-2,6,7-trioxabicyclo[2,2,2]octane to form a protected first generation polyether,

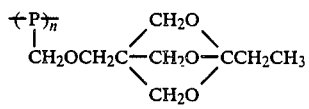

This protected polyether is then activated by reacting with acid such as hydrochloric acid to form the unprotected first generation polyether, P(CH$_2$O—CH$_2$C[CH$_2$OH]$_3$)$_4$. This polyether is converted to alkali metal salt form by reaction with alkali metal hydroxide or zero valence alkali metal and then reacted with a molar excess of the partially protected tosylate ether to form the protected second generation polyether. The foregoing sequence is repeated as desired for additional generation development according to conditions and procedures described in Endo et al., *J. Polym. Sci., Polym. Lett. Ed.*, 18, 457 (1980), Yokoyama et al., *Macromolecules*, 15, 11–17 (1982), and Padias et al., *Macromolecules*, 15, 217–223 (1982) These polyether dendrimers are particularly desirable for use in highly alkaline or highly acidic media wherein hydrolysis of a polyamidoamine dendrimer would be unacceptable.

Alternatively a mercapto reagent, represented by the formula:

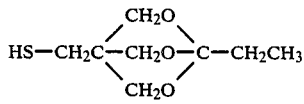

wherein X is mercapto, can be used to provide immobilized dendrimer polythioether moieties attached to an insoluble polymer backbone as follows:

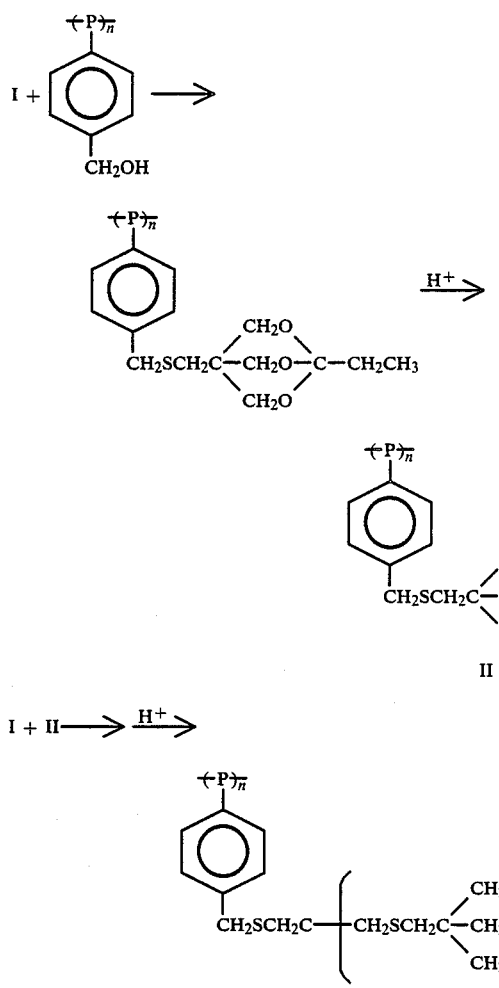

As an example of other dendrimers that are suitably prepared by the partially protected reactant method, polyamine dendrimers may be prepared by reacting ammonia or an amine having a plurality of primary amine groups with N-substituted aziridine such as N-tosyl aziridine or N-mesyl aziridine,

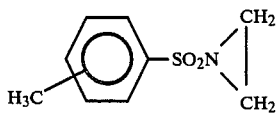

and N-mesyl aziridine,

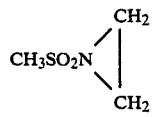

to form a protected first generation polysulfonamide and then activated with acid such as hydrochloric acid to form the first generation polyamine salt and reacted with further N-tosyl aziridine to form the protected second generation polysulfonamide which sequence can be repeated to produce higher generation polyamines using the general reaction conditions described in Humrichause, C. P., PhD, Thesis from University of Pennsylvania, "N-Substituted Aziridines as Alkylating Agents", Ref. No. 66-10, 624 (1966).

Examples of other nucleophilic core moieties include immobilized resins having pendant mercapto groups such as chloromethylated styrene/divinylbenzene copolymers and vinylbenzyl chloride/divinylbenzene copolymers that have been reacted with isothiourea to form pendant mercapto moieties Other nucleophilic core moieties can be prepared by reaction of the above mercapto terminated cores with alkylene oxides such as ethylene oxide to form cores having terminal hydroxyl moieties.

Of the immobilized core moieties, the cross-linked aromatic polymers having pendant amine or carboxyl groups are preferred for the preparation of polyamidoamine dendrimers by the successive excess reactant method and the halomethylated cross-linked aromatic polymers are preferred for the preparation of polyether dendrimers by the partially protected reactant method Examples of coreactant materials used to react with the nucleophilic core compounds include $\alpha,\beta$-ethylenically unsaturated carboxylic esters and amides such as methyl acrylate, ethyl acrylate, acrylonitrile, methyl itaconate, dimethyfumarates, maleic anhydride, acrylamide, as well as esters, acids and nitriles containing an acrylyl moiety, with methyl acrylate being the preferred coreactant material. In general, other preferred unsaturated reactants are volatile or otherwise readily removed from the core/coreactant reaction products without deleteriously affecting the reaction product.

Examples of the second coreactant materials used to react with the adduct of the nucleophilic core and the first coreactant include various polyamines such as alkylene polyamines and polyalkylene polyamines such as ethylenediamine, diethylenetriamine and tris(2-aminoethyl)amine; benzylic polyamines such as tris(1,3,5-aminomethyl)benzene: alkanolamines such as ethanolamine: and aziridine and derivatives thereof such as N-aminoethyl aziridine. Of these second coreactant materials, the volatile polyamines such as ethylenediamine and diethylenetriamine are preferred, with ethylenediamine being especially preferred.

Alternatively, the dendrimers can be prepared by reacting an electrophilic core such as an insoluble polyester with a coreactant such as a polyamine to form a core adduct which is then reacted with a suitable second coreactant such as an unsaturated ester to form the first generation polyamidoamine. Thereafter, this first generation product is reacted with a suitable third coreactant such as polyamine and then with the second coreactant such as unsaturated ester to form the desired second generation dendrimer. Examples of suitable electrophilic cores include the $C_1$–$C_4$ alkyl esters of various cross-linked polycarboxyl acids such as cross-linked polyacrylates e.g., copolymers of acrylate and methacrylate esters with polyethylenically unsaturated monomers such as divinylbenzene: cross-linked glycidyl methacrylates, and various other carboxylic acids represented by the formula:

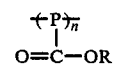

wherein P is the n-valent backbone of an insoluble resin having "n" pendant carboxyl moieties wherein R is hydrogen or lower alkyl, preferably methyl. Preferably "n" is a number from 3 to 5. Other suitable electrophilic core moieties include insoluble polyhalohydrocarbons such as polyhalo derivatives of insoluble predominantly hydrocarbon polymers, e.g., chloromethylated cross-linked aromatic polymers such as chloromethylated styrene/divinylbenzene copolymers as well as cross-linked polymers of vinyl and vinylidene halides, e.g., copolymers of divinylbenzene and vinyl chloride and/or vinylidene chloride. Preferred electrophilic cores include cross-linked resins derived from vinylbenzyl halides and chloromethylated styrene polymers. Of the electrophilic cores, the chloromethylated styrene/divinylbenzene copolymers are most preferred.

Suitable first coreactants for reaction with the insoluble electrophilic core moiety include polyalkylene polyamines such as ethylenediamine, trimethylenediamine, tetramethylenediamine, hexamethylenediamine, tris(2-aminoethyl)amine, diethylenetriamine, triethylenetetramine, 2,2'-iminobispropylamine and other polyamines represented by the formula:

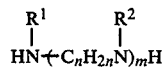

wherein $R^1$ and $R^2$ independently represent hydrogen or an alkyl, preferably $C_1$–$C_4$ alkyl, hydroxyalkyl, cyanoalkyl, or amido: n is at least 2 and preferably 2 to 6 and m is 2 to 100, preferably 2 to 5. Examples of suitable second coreactants to be used in preparing dendrimers from electrophilic cores include alkyl esters of ethylenically unsaturated carboxylic acids such as methyl acrylate, methyl methacrylate, ethyl acrylate and the like. Examples of suitable third coreactants are those illustrated for the first coreactant.

Thus prepared, the immobilized dendrimers can be reacted with a wide variety of compounds to produce the polyfunctional compounds having the unique characteristics that are attributable to the structure of the dendrimer. For example, alcohols and mercaptans can be combined to form alkylene(oxides/sulfides). The amine-terminated immobilized dendrimers can be reacted with halocarboxylic acids such as chloroacetic acid to form acid-terminated dendrimers or with hydroxy nitriles such as glyconitrile to form nitrile-terminated dendrimers. The nitrile moieties can then be hydrolyzed to yield terminated carboxylic acid groups. Other functionalizing reactions that can be used with the immobilized dendrimers are reported by P. Hodge & D. C. Scherrington in *Polymer Supported Reactions in Organic Synthesis*, John Wiley & Sons (1980).

In addition, the immobilized dendrimer may be reacted with an appropriate difunctional or trifunctional compound such as an organo polyhalide, e.g., 1,4-dichlorobutane polyesters such as poly(methyl acrylate): polyethers such as polyepichlorohydrin or polyisocyanate or polyisothiocyanate such as toluene diisocyanate, methylene diphenylene diisocyanate and polymers thereof (so-called MDI and polymeric MDI) and other aromatic polyisocyanates, aliphatic polyisocyanates and corresponding polyisothiocyanates, to form a poly(dendrimer) or bridged dendrimer having a plurality of dendrimers linked together through the residues of the polyhalide, polyester, polyether, or polyisocyanate. Dendrimer bridging also results when hydroxyl-terminated dendrimer is mixed with stoichiometric acid amounts of terminated dendrimer under esterification conditions or with hydroxyl-terminated dendrimer is subjected to ether-forming conditions.

Such reactions are further exemplified by the following working examples. In such working examples, all parts and percentages are by weight unless otherwise indicated.

EXAMPLE 1

Preparation of Immobilized Cores:

A macroporous chloromethylated copolymer is prepared using the procedures described in British Patent 1,050,207. The copolymer is prepared employing styrene, divinylbenzene, ethylvinylbenzene and isooctane diluent as starting materials.

Preparation of Aminated Resin:

To a solution of 300 g $N(CH_2CH_2CONHCH_2CH_2NH_2)_3$ (a first generation dendrimer) in 200 g of methanol and 200 g of dimethoxymethane is added a 90-g portion of the chloromethylated copolymer(immobilized core). The mixture is refluxed for 18 hours. The solution is filtered from the resin and then the resin is washed with methanol. The capacity of the aminated resin is 1.51 moles of amine groups per kilogram of dry resin. The structure of the aminated resin can be represented by the following formula:

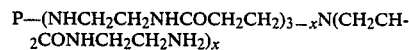

where x is 1 or 2 and P is the immobilized core.

Preparation of Immobilized Dendrimers:

To a solution of 28.8 g of methyl acrylate in 100 g of methanol and 100 g of dimethoxymethane is added a 93.8-g portion of the aminated resin. The mixture is refluxed for 18 hours. The solution is filtered from the resin, then washed with methanol to remove excess methyl acrylate. Analysis of the dried product by infrared spectroscopy indicated that a Michaels addition of the acrylate moieties to the terminal amino moieties of the aminated resin has occurred. The structure of the ester resin can be represented by the following formula:

Where x is 1 or 2 and P is the immobilized core.

A 63-g portion of the polyester Michaels addition product (ester resin) is added to a solution of 380 g of ethylenediamine in 160 g of methanol. The mixture is stirred at room temperature for three days. The solution is filtered from the resin then the resin is washed with methanol. Analysis of the dried product by infrared spectroscopy indicates the formation of amide groups and the disappearance of ester groups in the resin. The capacity of the dried dendrimer resin is 3.60 moles of amine groups per kilogram of dry resin.

The structure of this dendrimer resin can be represented by the following formula:

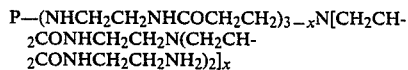

where x is 1 or 2 and P is the immobilized core.

Following the foregoing procedures, resins with larger (higher generation) dendrimers can be made by reacting the dendrimer resin shown above with methyl acrylate to form the ester resin with the structure represented by the following formula:

P—(NHCH$_2$CH$_2$NHCOCH$_2$CH$_2$)$_{3-x}$N(CH$_2$CH$_2$CONHCH$_2$CH$_2$N[CH$_2$CH$_2$CONHCH$_2$CH$_2$N(CH$_2$CH$_2$COOCH$_3$)$_2$]$_2$)$_x$ where x is 12 and P is immobilized initiator core and then reacting the ester resin with ethylene form the next generation amine dendrimer with the structure represented by the following formula:

P—(NHCH$_2$CH$_2$NHCOCH$_2$CH$_2$)$_{3-x}$N(CH$_2$CH$_2$CONHCH$_2$CH$_2$N[CH$_2$CH$_2$CONHCH$_2$CH$_2$N(CH$_2$CH$_2$CONHCH$_2$CH$_2$NH$_2$)$_2$]$_2$)$_x$ where x is 1 or 2 and P is immobilized initiator core.

EXAMPLE 2

A 20-fold molar excess of ethylenediamine is added to 20 g of a second batch of chloromethylated copolymer which is prepared as outlined in Example 1. The mixture is heated at 118° C for 6 hours and then cooled. The solution is filtered from the resin and the resin washed with methanol. The capacity of the aminated resin is 6.82 moles of amine groups per kilogram of dry resin and has a structure represented by the following formula:

70% P—NHCH$_2$CH$_2$NH$_2$

30% P—NHCH$_2$CH$_2$NH—P where P is immobilized core.

The ester resin is prepared by heating 136 g of methyl acrylate and 19.1 g of ethylenediamine aminated resin for 18 hours at 70° C. The mixture is cooled, then the solution is filtered from the resin and the resin washed with methanol. The yield of the product is 28.2 g. Analysis by infrared spectroscopy and elemental analysis indicates that the ester resin has a structure primarily represented by the following formula:

70% P—NHCH$_2$CH$_2$N(CH$_2$CH$_2$COOCH$_3$)$_2$ where P is immobilized core.

In a manner similar to Example 1, the ester resin can be reacted with ethylenediamine to form the dendrimer resin (first generation) with a structure primarily represented by the following formula:

70% P—NCH$_2$CH$_2$N(CH$_2$CH$_2$CONHCH$_2$CH$_2$NH$_2$)$_2$

Where P is immobilized core.

Higher generation dendrimers can be prepared by alternately reacting methyl acrylate then ethylenediamine with the resin.

EXAMPLE 3

The chloromethylated copolymer used in Example 2 is treated with potassium iodide by heating 30.0 g of chloromethylated copolymer with 3.0 g of potassium iodide in 400 mL of methanol for 18 hours at 65 ° C. The methanol then treated copolymer is cooled, rinsed with dried. The treated copolymer (10.0 g) is swelled in 250 mL of perchloroethylene for one hour, then the temperature is increased to 121° C. with lower boiling components being removed. To this solution is added 63.5 g of 2-ethyl-2-oxazoline. The reaction mixture is refluxed for 5.5 hours, then cooled. The solution is filtered from the resin and the resin washed with methanol and then dried. The yield of resin is 34.2 g with an elemental analysis of: C, 64.6 percent: H, 8.56 percent; N, 10.12 percent. The structure for this polyoxazoline resin can be represented by the following formula:

P—(N(COCH$_2$CH$_3$)CH$_2$CH$_2$)$_{5.4}$Cl where P is immobilized core.

The amide of the polyoxazoline resin is hydrolyzed by refluxing 29.3 g of resin in 300 mL of 4M hydrochloric acid for 3 days. The resin is washed with water and then dried. The yield of polyethyleneimine resin is 19.8 g with a total nitrogen level of 15.01 percent and 8.54 moles of secondary amine groups per kilogram of resin. The structure of this polyethyleneimine can be represented by the following formula:

P—(N(COCH$_2$CH$_3$)CH$_2$CH$_2$—)$_{1.1}$—(NHCH$_2$CH$_2$)$_{4.3}$Cl where P is immobilized core.

The polyethyleneimine resin (15.0 g) is stirred with 130 g of methyl acrylate for 20 hours at 70° C. to produce the ester resin. The resin is washed with methanol and then dried. The yield is 25.5 g. The structure of this ester resin can be represented by the following formula:

P—(N(COCH$_2$CH$_3$)CH$_2$CH$_2$)$_{1.1}$—(N(CH$_2$CH$_2$COOCH$_3$)CH$_2$CH$_2$—)$_{4.3}$Cl where P is immobilized core.

In a manner similar to Example 1, the ester resin is reacted with ethylenediamine to form the dendrimer resin (first generation) with a structure primarily represented by the following formula:

P—(N(COCH$_2$CH$_3$)CH$_2$CH$_2$)$_{1.1}$—(N(CH$_2$CH$_2$CONHCH$_2$CH$_2$NH$_2$)CH$_2$CH$_2$—)$_{4.3}$Cl where P is immobilized core. Higher generation dendrimers can then be prepared by alternately reacting methyl acrylate, then ethylenediamine with the resin.

What is claimed is:

1. An improved dense star polymer prepared in a reaction medium having at least one branch emanating from an immobilized core which core and its precursor are insoluble in the reaction medium in which the dense star polymer is prepared, said branch called a core branch having at least two terminal groups provided that (1) the ratio of terminal groups to the core branches is more than one, (2) the density of terminal groups per unit volume in the polymer is at least 1.5 times that of an extended conventional star polymer having similar core and monomeric moieties and a comparable molecular weight and number of core branches, each of such branches of the extended conventional star polymer bearing only one terminal group, and (3) a molecular volume that is no more than about 80 percent of the molecular volume of said extended conventional star polymer as determined by dimensional studies using scaled Core-Pauling molecular models.

2. The polymer of claim 1 wherein the core is derived from a cross-linked aromatic polymer.

3. The polymer of claim 2 wherein the aromatic polymer is a copolymer of styrene and divinylbenzene and the terminal groups of the dense star polymer are amine groups or carboxylic ester groups.

4. The polymer of claim 1 having a polyvalent core that is covalently bonded to at least two ordered dendritic (tree-like) branches which extend through at least two generations.

5. The polymer of claim 4 which has at least three ordered dendritic branches.

6. An excess reactant process for producing the dense star polymer of claim 1 comprising the steps of
   (A) contacting
      (1) an immobilized core compound having at least one nucleophilic or one electrophilic moiety called an N/E moiety with
      (2) an excess of a first organic coreactant having (a) a core-reactive moiety which is reactive with the N/E moieties of the immobilized core compound and (b) an N/E moiety which does not react with the N/E moiety of the core compound under conditions sufficient to form a core adduct wherein each N/E moiety of the core compound has reacted with the core reactive moiety of a different molecule of the first coreactant;
   (B) contacting
      (1) the core adduct having at least twice the number of N/E moieties as the core compound with
      (2) an excess of a second organic coreactant having (a) one moiety (hereinafter called an adjust reactive moiety) which will react with the N/E moieties of the core adduct and (b) a N/E moiety which does not react with the N/E moiety of the core adduct under conditions sufficient to form a first generation adduct having a number of N/E moieties that are at least twice the number of N/E moieties in the core adduct; and
   (C) contacting the first generation adduct with an excess of a third organic coreactant having one moiety that is reactive with the N/E moieties of the first generation adduct and an N/E moiety that does not react with the N/E moieties of the first generation adduct under conditions sufficient to form a second generation dendrimer.

7. The process of claim 6 wherein the immobilized core compound is a chloromethylated copolymer of styrene and divinylbenzene, the first organic coreactant is an alkylene polyamine, and the second organic coreactant is an acrylate ester.

8. The process of claim 7 wherein the alkylene polyamine is ethylenediamine and the second organic coreactant is methyl acrylate.

9. A partially protected reactant process for producing the dense star polymer of claim 1, wherein said dense star polymer is a polyamine, comprising the steps of
   (A) contacting
      (1) an immobilized core compound having at least one N/E moiety and
      (2) a first organic coreactant having a moiety which is reactive with the N/E moieties of the core compound and a blocking moiety, which does not react with the N/E moieties of the core compound, under conditions sufficient to form a blocked core adduct wherein each N/E moiety of the core compound has reacted with the reactive moiety of a different molecule of the first organic coreactant to form an adduct having block N/E moieties:
   (B) removing the blocking moieties from the blocked core adduct to form a first generation adduct having N/E moieties;
   (C) contacting
      (1) the first generation adduct which has at least twice the number of terminal N/E moieties as the core compound with
      (2) a second organic coreactant having a moiety which will react with the terminal N/E moieties of the first generation adduct and a blocking moiety (which does not react with the N/E moieties of the first generation adduct) under conditions sufficient to form a blocked second generation adduct having a number of blocked second generation adducts having a number of blocked N/E moieties that are at least twice the number of blocked N/E moieties in the blocked core adduct; and
   (D) removing the blocking moieties from the blocked second generation adduct to form a second generation adduct or dendrimer.

* * * * *

UNITED STATES PATENT AND TRADEMARK OFFICE
CERTIFICATE OF CORRECTION

PATENT NO. : 4,857,599

DATED : August 15, 1989

INVENTOR(S) : Donald A. Tomalia, et al

It is certified that error appears in the above-indentified patent and that said Letters Patent is hereby corrected as shown below:

Column 1, line 14, the word "1983)" should read -- 1983 --.

Column 5, line 41, the word "moieties" should read -- moieties. --

Column 6, line 16, the word "dendritie" should read -- dendritic --.

Column 6, line 59, "$Z_c$" should appear as -- $Z^c$ --.

Column 7, line 6, delete one "I" after the word compound.

Column 7, line 6, the word "generations:" should read -- generations; --.

Column 7, line 30-35, the beginning of the formula "( I(Zc)Nc)" should read -- ( I $(Z^c)_{N_c}$ ) --.

Column 8, lines 1-10, the "I" should read -- I --.

Column 9, line 66, the word "moieties" should read -- moieties. --.

Column 10, line 62, after the word "metal" insert -- M° --.

Column 12, line 11, the formula "I(Z⊖⊕M)n" should read -- I(Z⊖⊕M)n --.

Column 12, lines 60-65, the formula should appear as follows:

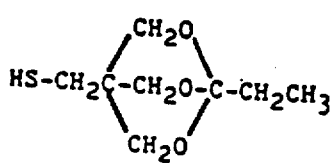

)

I

UNITED STATES PATENT AND TRADEMARK OFFICE
CERTIFICATE OF CORRECTION

PATENT NO. : 4,857,599  
DATED : August 15, 1989  
INVENTOR(S) : Donald A. Tomalia et al Page 2 of 3

It is certified that error appears in the above-indentified patent and that said Letters Patent is hereby corrected as shown below:

Column 14, line 8, the word "moieties" should read -- moieties. --.

Column 14, line 19, the word "method" should read -- method. --.

Column 14, line 24, the word "dimethyfumarates" should read -- dimethyl fumarates --.

Column 14, line 55, the word "polycarboxyl" should read --polycarboxylic--.

Column 16, line 50, the word "Where" should read -- where --.

Column 17, line 10, the numbers "12" should read -- 1 or 2 --.

Column 17, line 11, the word "ethylene" should read --ethylenediamine to--.

Column 17, line 53, the formula "70% P-NCH$_2$CH$_2$N(CH$_2$CH$_2$CONHCH$_2$CH$_2$NH$_2$)$_2$" should read -- 70% P-NHCH$_2$CH$_2$N(CH$_2$CH$_2$CONHCH$_2$CH$_2$NH$_2$)$_2$ --.

Column 17, line 54, the word "Where" should read -- where --.

Column 17, line 64, delete the words "methanol then".

Column 17, line 65, before the word "dried" insert the words -- methanol then --.

Column 18, lines 19-23, the formula should appear as  
-- P-(N(COCH$_2$CH$_3$)CH$_2$CH$_2$)$_{1.1}$-(NHCH$_2$CH$_2$-)$_{4.3}$Cl --.

UNITED STATES PATENT AND TRADEMARK OFFICE
CERTIFICATE OF CORRECTION

PATENT NO. : 4,857,599

DATED : August 15, 1989

INVENTOR(S) : Donald a. Tomalia, et al

It is certified that error appears in the above-indentified patent and that said Letters Patent is hereby corrected as shown below:

Column 19, line 27, the word "adjust" should read -- adduct --.

Signed and Sealed this

Thirteenth Day of September, 1994

Attest:

BRUCE LEHMAN

*Attesting Officer*  *Commissioner of Patents and Trademarks*